Figure 1:
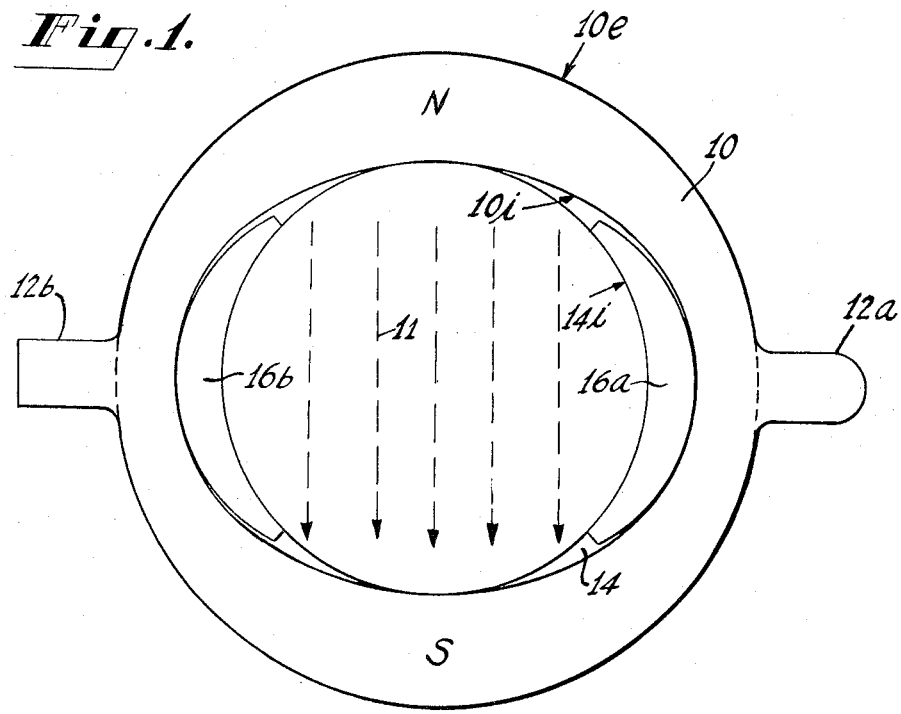

Feb. 7, 1967 P. G. McCABE ETAL 3,303,443
MAGNETIC DEVICE HAVING ELLIPTICALLY SHAPED OPENING
Filed Aug. 31, 1964

INVENTORS
PHILIP G. McCABE &
EUGENE LEMKE
BY William H. Meagher
Attorney

United States Patent Office 3,303,443
Patented Feb. 7, 1967

3,303,443
MAGNETIC DEVICE HAVING ELLIPTICALLY SHAPED OPENING
Philip George McCabe and Eugene Lemke, Indianapolis, Ind., assignors to Radio Corporation of America, a corporation of Delaware
Filed Aug. 31, 1964, Ser. No. 393,270
6 Claims. (Cl. 335—210)

The present invention is directed generally to magnetic devices and, particularly, to magnetic devices suitable for effecting so-called color purity adjustments in a color kinescope, such adjustments involving coincident displacement of multiplicity of beams in a similar direction and to a similar degree.

The provision for so-called "color purity" adjustments is a practical necessity in obtaining proper operation of a three-gun shadowmask color kinescope. In United States Patent No. 2,950,407, entitled, "Electric Beam Controlling Apparatus," and issued to William H. Barkow and Martin W. Schmutz on August 23, 1960, the problem of "color purification" and its causes are discussed at length, and apparatus for achieving color purity corrections is shown and described. While reference may be made to the foregoing patent for a detailed explanation, it should suffice for present purposes to describe color purity correction as a common adjustment of the position of all three beams of the color kinescope so that deflection of the beams is associated with the proper "color centers" whereby the approach of each beam to the shadow mask is at the proper angle to cause excitation of the phosphor dots of the appropriate color.

In the Barkow and Schmutz patent, an arrangement of a pair of ring-shaped permanent magnets, magnetized across a diameter, is shown surrounding the kinescope neck at a position preceding the kinescope's deflection yoke to provide a magnetic field transverse with respect to the tube neck axis for shifting the beam array as required for color purity correction. Each of the permanent magnet rings is rotatable about the tube neck whereby both the direction and magnitude of the transverse magnetic field may be selectively adjusted.

The present invention is directed to an improvement in the permanent magnet arrangement typified by the noted Barkow and Schmutz patent, whereby establishment of a highly uniform color purity field through the neck of the kinescope is more readily realized. In accordance with the principles of the present invention, the shape of each permanent magnet ring used for color purity adjustment purposes is altered from the conventional form of an annulus defined by concentric circles. Pursuant to a preferred embodiment of the present invention, the outer periphery of each color purity magnet ring is defined by a circle, whereas the inner periphery of each ring is defined by a curve approximating an ellipse. As a result of such a difference in the curvature of the inner and outer peripheries, the radial dimension of each ring with reference to its central axis is a maximum at two diametrically opposed regions, and such dimensions gradually diminishes around the ring periphery to a minimum at respective diametrically opposed regions half-way between the maximum radial dimension regions. Each ring (of a material having a permeability significantly greater than unity) is magnetized across a diameter extending between the regions of maximum radial dimension.

As a result of the indicated shaping and magnetizing of each color purity magnet ring, a highly uniform magnetic field is established in the aperture of the ring; i.e., the lines of magnetic flux within the elliptical space encircled by each ring are essentially all straight and parallel. Thus, when the rings are mounted to encircle the neck of a color kinescope, a uniform magnetic field is established within the interior of the neck portion encircled by the color purity rings, assuring displacement of all beams within the neck to an equal degree and in the same direction.

A significant advantage of the present invention resides in the fact that the noted field uniformity effects are readily obtained with use of very simple magnetizing techniques in the course of producing the rings—techniques that may be carried out successfully by relatively unskilled personnel, or that may, indeed, readily be automated. Essentially all that is required is placement of a ring of the indicated shape in a magnetizing field established with appropriate strength between parallel planes, with the ring oriented so that the magnetizing lines of flux are parallel to the ring diameter extending between regions of maximum radial dimension (i.e., parallel to the minor axis of the elliptical aperture of the ring). In contrast, use of such a magnetizing technique to magnetize a ring of the conventional form of an annulus defined by concentric circles produces results notably unsatisfactory for purity use with a multi-gun color kinescope, the fields within the aperture of the ring magnet so processed being decidedly non-uniform. While it is understood that such field non-uniformity in the apertures of ring magnets of the concentric circle annulus type may be overcome or avoided, to at least some degree, by the use of more complicated magnetizing techniques, the latter necessarily add to the cost of manufacturing the units, appear to require the use of relatively skilled personnel and/or relatively elaborate magnetizing equipment, and are inherently less amenable to automation.

A primary object of the present invention is to provide a novel and improved ring magnet structure suitable for beam control purposes.

A further object of the present invention is to provide novel color purity adjusting means for a color kinescope, such novel means providing a color purity adjusting field of high uniformity.

An additional object of the present invention is to provide, for use with a color kinescope, a novel color purity adjusting structure, capable of producing a purity adjusting field having a high degree of uniformity, while subject to manufacture using relatively simple production techniques.

Figure 2:
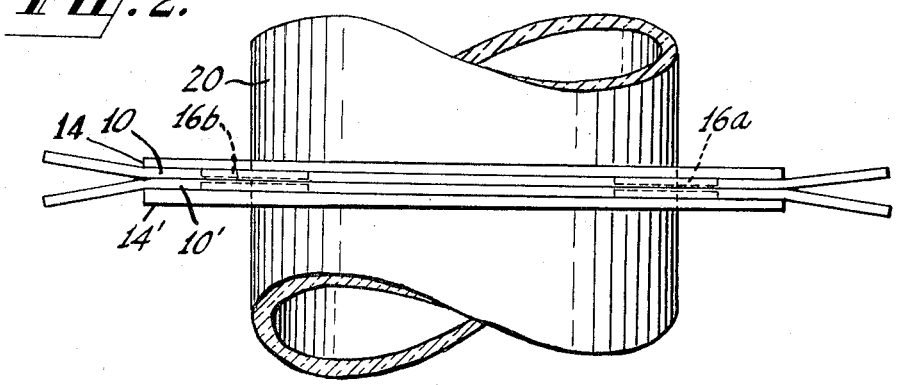

Other objects and advantages of the present invention will be readily recognized by those skilled in the art upon a reading of the following detailed description and an inspection of the accompanying drawing in which:

FIGURE 1 illustrates, in plan view, a color purity adjusting magnet ring embodying the principles of the present invention; and FIGURE 2 illustrates, in side view, color purity adjusting structure incorporating a pair of permanent magnet rings in accordance with an embodiment of the present invention.

The plan view of FIGURE 1 shows a flat ring 10 of magnetic material, having an outer edge 10e of circular contour and an inner edge 10i of a contour that is elliptical, or an approximation thereof. The radial dimension of the ring surface, relative to its center of curvature, is accordingly not constant, but rather varies from a maximum at respective diametrically opposed points (effectively along the minor axis of the inner edge ellipse) to a minimum at respective points midway between the maxima (the minimum points being effectively along the major axis of the inner edge ellipse).

The ring 10 is permanently magnetized across the diameter extending between regions of maximum radial dimension; i.e., it is magnetized in a direction parallel to the minor axis of the elliptical inner edge. The result is the production of a permanent magnetic field in the space enclosed by the ring 10, the field comprising essentially straight, mutually parallel flux lines 11, oriented in the aforesaid minor axis direction, throughout the enclosed space.

To facilitate rotational use of the ring 10, it is secured to a support ring 14 of non-magnetic (e.g., plastic) material, the support ring 14 having an outer edge of circular contour matching the outer edge 10E of the magnet ring 10, and an inner edge 14i of a concentrically circular contour with a diametric dimension essentially equal to the minor axis dimension of the elliptical inner edge 10i of magnetic ring 10. The support ring 14 has a generally flat washer-like form but departs therefrom by the provision of two generally crescent-shaped raised portions, 16a and 16b, respectivey, in respective, diametrically opposed regions near its inner edge. The inner curve of each crescent follows the contour of the inner edge 14i, while the outer curve of each crescent essentially matches the curvature and dimensions of the magnet ring's inner edge 10i in the vicinity of the major axis termini (i.e, in the vicinity of the ring regions of minimum radial dimension).

The magnet ring 10 and its associated support ring 14 may be assembled simply by properly orienting the magnet ring aperture relative to the outer crescent surfaces, and then snapfitting the magnet ring over the raised portions 16a, 16b, pressing the adjacent flat surfaces of the respective rings into abutment. While raised portions 16a, 16b, of the indicated contour and dimensions, will tend to maintain the rings assembled in fixed, non-slip relationship, further securing means, such as adhesive between the abutting flat surfaces of the respective rings, may additionally be employed for such purpose, if desired.

For ease of manual rotation of the assembled rings, the magnet ring 10 is provided with a pair of ears or tabs 12a and 12b, which extend outwardly at respective diametrically opposed locations along the outer edge 10e. For indexing purposes, the respective tabs are differentiated in some manner, as by the illustrated rounded outer edge of tab 12a in contrast with the flat outer edge of tab 12b.

In use for color purity adjustment in a color kinescope, a pair of magnet ring structures of the FIGURE 1 variety are preferably employed, as illustrated in the side view of FIGURE 2. Magnet ring 10, in assembly with its associated support ring 14, encircles the cylindrical neck 20 of a color kinescope (only partially shown). Also encircling the neck 20 is a second magnet ring 10′, in assembly with its support ring 14′. The two ring units, preferably of identical construction are oppositely faced with the free surfaces of their magnet rings in abutting relationship. As shown in the FIGURE 2 side view, the tabs of each magnet ring are preferably bent toward the associated support ring to ensure clearance, during rotation, with respect to the tabs of the adjoining unit.

The strength of the magnetic field developed within the encircled portion of the kinescope neck will depend upon the rotational positions of the two magnet rings 10, 10′ relative to each other. Thus, for example, if the relative rotational positions of the oppositely faced rings 10 and 10′ are such that like tabs are in registry, the net field will be of minimum strength (the respective fields of the two magnets directly opposing each other). With unlike tabs in registry, the respective fields will be in the same direction and will mutually aid to produce a maximum strength field. Intermediate degrees of "spreading" of like tabs will produce correspondingly intermediate strengths of the produced field. Alteration of the direction of the produced field, without changing the strength, may be effected simply by equal rotation of both rings.

An important aspect of the present invention is that excellent field uniformity (as suggested by the illustrated pattern of straight, parallel flux lines 11) can be obtained from structures admitting of use of simple, straightforward fabrication and processing techniques in the course of their manufacture. Illustratively, the ring 10 may be stamped out of a sheet of suitable magnetizable material, such as spring steel. Magnetization of the stamped ring 10 may be carried out in a straightforward manner using a uniform, straight line magnetizing field, with the ring 10 oriented in the field so that the magnetizing lines of flux extend in a direction parallel to the minor axis of the elliptical aperture. Disposing the center line passing through the tabs 12a, 12b in a direction perpendicular to the magnetizing direction establishes such proper orientation. The associated support ring 14 may be readily formed of a suitable non-magnetic, plastic material, such as Cycolac, by well known molding techniques. Assembly of the magnet and support rings in the simple manner previously described then completes the manufacturing process.

As noted previously, use of the simple magnetizing techniques referred to above will not produce results of comparable merit when the magnetic rings are of a conventional concentric circle annulus form. Rather, in such case, a magnetic field of appreciable non-uniformity is established in the circular aperture of the magnetic ring; i.e., a flux line pattern is developed which departs from the desired straight, parallel line pattern and assumes a so-called "pincushion" form, where the lines of flux curve inwardly at the middle, the degree of curvature increasing with distance from the center of the field. Use of such a pincushion field for color purity properties is highly unsatisfactory, since the respective beams of the color kinescope, located at different points in this distorted field, would be subject to deflections in different directions, contrary to the desired purpose of shifting the beam array in a single, common direction.

It is not believed necessary to give a detailed explanation of a theory explaining how such pincushion field distortion is avoided through use of the elliptical aperture shaping of the present invention. However, it may be noted, by way of partial explanation, that (1) for a considerable distance on either side of the magnetic field's center line (lying along the aforementioned minor axis) the air gap length traversed by the flux means relatively constant (i.e., lessening to a much smaller degree than in the case of a circular aperture); and (2) to whatever degree the air gap length does lessen with distance from said center line, such gap length lessening is accompanied by a lessening in associated magnetic material (due to the lessening in the radial dimension of the ring). It should be noted that toward the extreme edges of the elliptical aperture most remote from the aforementioned minor axis center line, there may likely be some departure from a parallel line flux pattern (i.e., some pincushion type curving of the flux lines). However, flux line curving in these aperture regions, which fall outside of the kinescope neck envelope in use of the rings, is of no deleterious consequence.

What is claimed is:

1. An apertured permanent magnet device comprising a generally ring-like configuration of magnetic material having an outer edge, and an inner edge defining the bounds of an aperture in said device, said outer edge having a circular contour and said inner edge having a contour substantially corresponding to an ellipse, said ring-like configuration of magnetic material being magnetized in a direction generally parallel to the minor axis of said ellipse.

2. A permanent magnet device comprising a flat strip of magnetic material disposed in the configuration of a closed ring having a circular outer edge and an elliptical inner edge, whereby the width of said strip varies between a maximum at two diametrically opposed points along the ring periphery and a minimum at two additional diametrically opposed points halfway between the maximum width points, said magnetic material being magnetized in a direction parallel to the ring diameter extending between said maximum width points.

3. Beam controlling apparatus comprising, in combination, an apertured magnet ring having an inner edge defining the bounds of the magnet ring aperture in accordance with a closed curve substantially corresponding to an ellipse, and an apertured support ring of non-magnetic material in juxtaposition with said magnet ring and having an inner edge defining the bounds of the support ring aperture in accordance with a closed curve corresponding to a circle of a diameter substantially equal to the minor axis dimension of said ellipse.

4. Beam controlling apparatus comprising, in combination, an apertured magnet ring having an inner edge defining the bounds of the magnet ring aperture in accordance with a closed curve substantially corresponding to an ellipse, and an apertured support ring of non-magnetic material in juxtaposition with said magnet ring and having an inner edge defining the bounds of the support ring aperture in accordance with a closed curve corresponding to a circle of a diameter substantially equal to the minor axis dimension of said ellipse,
   said magnet ring being magnetized in a direction substantially parallel to said minor axis.

5. Color purity adjusting apparatus for use with a color kinescope having a cylindrical neck portion, said apparatus comprising in combination, a ring of non-magnetic material having a circular outer edge and having a concentrically circular inner edge defining an aperture dimensioned to receive said cylindrical neck portion, and a ring of magnetic material having a circular outer edge and having an inner edge defining the boundary of the magnet ring aperture in accordance with a closed curve substantially corresponding to an ellipse having a major axis dimension significantly greater than the diameter dimension of said neck receiving aperture, said ring of magnetic material being magnetized in a direction perpendicular to said major axis.

6. In combination with a color kinescope having a cylindrical neck portion enclosing the paths of a plurality of electron beams, color purity correction apparatus comprising the combination of a pair of magnetic ring assemblies mounted in juxtaposition on said neck portion, each of said magnetic ring assemblies including a ring of non-magnetic material having a circular outer edge and having a concentrically circular inner edge defining an aperture dimensioned to receive said cylindrical neck portion, and a ring of magnetic material having a circular outer edge and having an inner edge defining the boundary of the magnet ring aperture in accordance with a closed curve substantially corresponding to an ellipse having a major axis dimension significantly greater than the diameter dimension of said neck receiving aperture, said ring of magnetic material being magnetized in a direction perpendicular to said major axis.

References Cited by the Examiner
UNITED STATES PATENTS

| | | | |
|---|---|---|---|
| 2,275,880 | 3/1942 | Arey | 317—201 |
| 2,513,929 | 7/1950 | Gethmann | 313—77 |
| 3,205,414 | 9/1965 | Steingroever | 313—84 X |

BERNARD A. GILHEANY, *Primary Examiner.*

G. HARRIS, *Assistant Examiner.*